United States Patent [19]

Tregoning

[11] 4,169,525

[45] Oct. 2, 1979

[54] FRICTION BRAKE APPARATUS AND SLACK ADJUSTING MEANS THEREFOR

[75] Inventor: Geoffrey R. Tregoning, London, England

[73] Assignee: Westinghouse Brake & Signal Co. Ltd., London, England

[21] Appl. No.: 840,816

[22] Filed: Oct. 11, 1977

[30] Foreign Application Priority Data

Oct. 9, 1976 [GB] United Kingdom ............... 42067/76

[51] Int. Cl.² ............................................ F16D 65/56
[52] U.S. Cl. ................................. 188/196 D; 188/203
[58] Field of Search ........ 188/196 D, 196 BA, 196 P, 188/202, 203

[56] References Cited

U.S. PATENT DOCUMENTS

| 3,100,032 | 8/1963 | Larsson | 188/203 X |
| 3,899,053 | 8/1975 | Nadas | 188/203 |

*Primary Examiner*—Duane A. Reger
*Attorney, Agent, or Firm*—Larson, Taylor and Hinds

[57] ABSTRACT

Slack adjusting means comprises a linearly movable input member, a linearly movable output member, and an element for transmitting a brake force from the input member to the output member, characterized in that the input and output members are constrained against relative angular movement, and in that the element is engaged with one of said members via co-operating helical thread means provided therebetween and is engageable with the other of said members via co-operable clutch faces provided therebetween and arranged such that in use the clutch faces are retained in force-transmitting engagement by the reaction forces in the co-operating helical thread means and are disengageable when said reaction forces are removed or relieved thereby to permit relative rotation, and hence relative linear displacement corresponding to the slack to be taken up, between the element and said one member in engagement therewith via the co-operating helical thread means.

21 Claims, 7 Drawing Figures

FRICTION BRAKE APPARATUS AND SLACK ADJUSTING MEANS THEREFOR

This invention relates to friction brake apparatus and slack adjuster means therefor.

Friction brake apparatus is well known in the field of railway braking to comprise a brake force actuator which operates via a linkage on a brake force applying member provided with a brake block or pad of frictional material to urge the block or pad against a wheel or a disc attached to the wheel or its axle for rotation therewith. As the block or pad of frictional material wears away, slack builds up in the linkage and it is therefore desirable to provide slack adjusting means that automatically adjusts for this slack and/or to provide friction brake apparatus sensitive to the clearance between the brake block or pad and the wheel or disc.

According to a first aspect of this invention there is provided slack adjusting means comprising a linearly movable input member, a linearly movable output member, and an element for transmitting a brake force from the input member to the output member, characterised in that the input and output members are constrained against relative angular movement by means excluding said element, in that the element is engaged with one of said members via co-operating helical thread means provided therebetween and is engageable with the other of said members via co-operable clutch faces provided therebetween and arranged such that in use the clutch faces are retained in force-transmitting engagement by the reaction forces in the threaded engagement and are disengaged when said reaction forces are removed to permit relative rotation and hence linear displacement, corresponding to any wear, between the element and the said one member in helically threaded engagement therewith.

The co-operable clutch faces may form a dog clutch or a friction clutch.

According to a second aspect of the present invention there is provided friction brake apparatus including a brake force applying member coupled via a linkage and slack adjusting means to a brake force actuator, characterised in that the linkage includes a one-way clutch and is arranged such that on return operation of the brake force applying member to release the brake, the force applying member is permitted to return a predetermined distance prior to the clutch becoming effective to resist further return movement of the brake force applying member yet permit further return motion of the brake force actuator by virtue of the slack adjusting means.

Preferably the slack adjusting means accords with said first aspect of this invention.

In one arrangement, the one-way clutch may be included in position sensing means incorporating means which resiliently opposes the force exerted by the actuator and takes up a position corresponding to the position of the force applying member in a brake application, said predetermined distance being provided by lost motion as between the one-way clutch and the force applying member.

Said predetermined distance may be taken up by compression of resilient spacing means between the one-way clutch and the brake force applying member.

In a caliper brake configuration the one-way clutch may be provided between the arms of a caliper with caliper ends coupled between respective force applying members.

In the case of such a caliper, predetermined distances may be provided for by compression of resilient means between at least one said caliper end and the respective force applying members.

In an alternative arrangement the brake force applying member may be coupled to the brake force actuator via the slack adjusting means and coupling means including the one-way clutch, the predetermined distance being provided for by lost motion as between the clutch and the slack adjusting means.

By way of non-limiting example, embodiments of this invention will now be described with reference to the accompanying drawings of which

Figure 1:
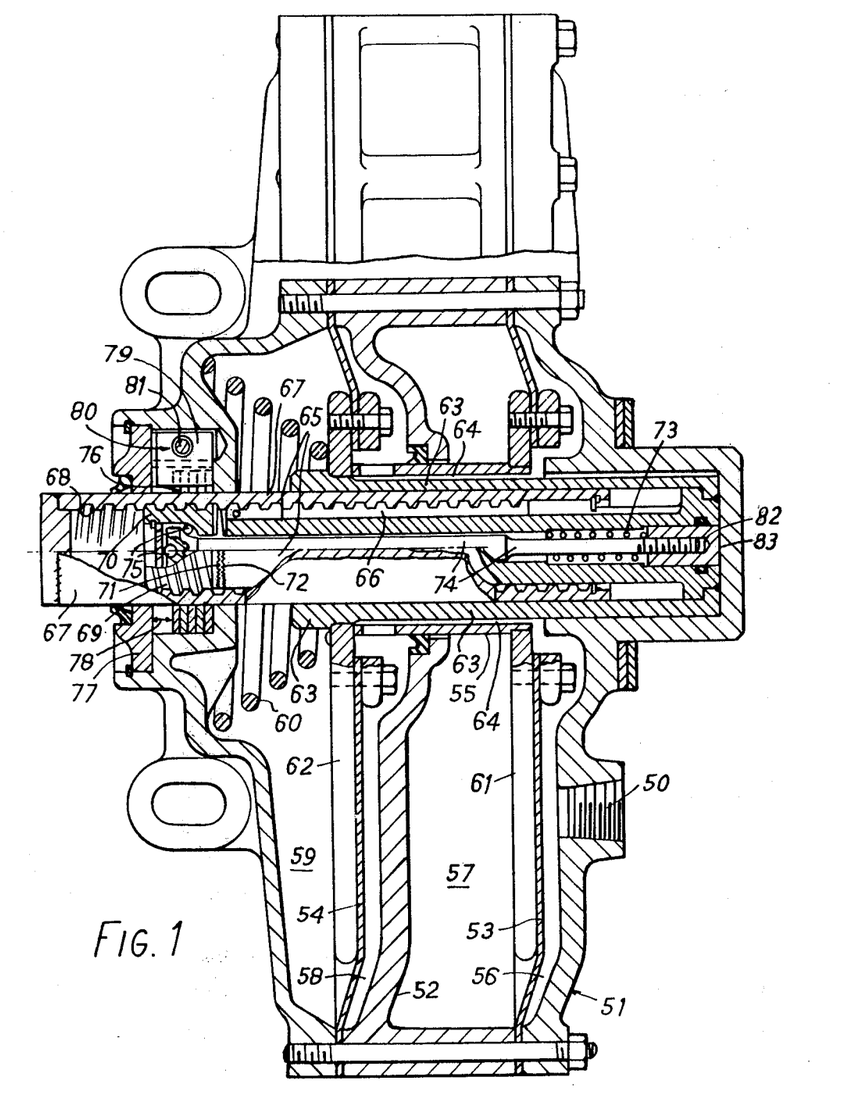
FIG. 1 is a partly-sectioned schematic diagram of a brake force supplying arrangement including inter alia slack adjusting means in a first form of embodiment of this invention.

The brake force supplying arrangement of FIG. 1 is a combination of a brake force actuator and a slack adjuster to provide a so-called "tread brake unit" for a single hanger brake of a railway vehicle. To obtain a sufficient brake force output from the arrangement, within a restricted space, the actuator is of a double-diaphragm type and comprises a casing 51 having a partition wall 52 therein and a flexible diaphragm 53, 54 to each side of the partition wall so as to separate the casing into four chambers 56, 57, 58 and 59. The flexible diaphragms 53, 54 are backed by pressure plates 61, 62 that are operatively connected by a sleeve 55 extending through the partition wall 52 such that movement of plate 61 to the left (when viewed as in FIG. 1) causes plate 62 to move in the same direction and such that movement of plate 62 to the right (when viewed as in FIG. 1) causes plate 61 to move in that direction. The plate 62 is welded to one end of a tube 63 extending through the plates 61, 62 and, with a lateral clearance 64, through the sleeve 55. The tube 63, the plates 61, 62 and the sleeve 55 are all urged to the right (when viewed as in FIG. 1) by a compression spring 60 in chamber 59 and acting between the casing 51 and the plate 62. The casing 51 is provided with an inlet 50 for compressed air in its wall bounding chamber 56 so that such air can pass from chamber 56 to chamber 58 via the clearance 64 and thereby deflect the flexible diaphragms 53, 54. This tandem deflection causes the two pressure plates 61, 62 to move likewise in tandem so that the tube 63 is moved forcibly to the left against the action of spring 60. By this tandem arrangement of the two diaphragms 53, 54 and of the two pressure plates 61, 62 the force that can be applied by tube 63 is double that which would be available from just one diaphragm and pressure plate of the same area.

The slack adjuster, which is responsive to movement and force application of the tube 63, comprises a tubular rod 65 within the tube 63 and welded thereto at the end of tube 63 remote from spring 60. The tube 65 has a keyway 66 milled in its outer surface, and is encompassed by a tubular member 67 that is longitudinally slidable within the tube 63. A key in the keyway 66 engages with the tubular member 67 such as to prevent relative rotation but permit relative longitudinal movement between the rod 65 and the member 67. The tubular member 67 has its internal surface formed with a non-locking helical thread 68 (e.g. of 45°) and this is meshingly engaged by the mating helical thread 69 formed on the external surface of a coupling element 70 disposed within the tubular member 67. The mutually facing end surfaces 71, 72 of the coupling element 70 and the tubular rod 65 are each formed with co-operating or mating shallow grooves and ridges in a radiating configuration so as to form the surfaces 71, 72 as mutually co-operable clutch faces. The two clutch faces 71, 72 are urged into mutual engagement by a helical compression spring 73 acting between the rod 65 and a stem extending therethrough (and through the spring 73), the stem 74 being movable longitudinally with the coupling element 70 but rotatable relative thereto by bearing means 75.

The tubular member 67 has a portion projecting outwardly of casing 51 and this portion has a stack of C-shaped washers 76 mounted thereon with the inner periphery of the washers tightly engaging frictionally the outer surface of the tubular member 67. An aperture cap 77 attached to the casing 51 covers the washers 76 and provides a predetermined clearance 78 between the inner surface of cap 77 and the nearest one of the washers 76. The tight frictional engagement of tubular member 67 by the C-shaped washers 76 can be relieved by a resetting mechanism 80 comprising a bar 79 extending into the mouth of each C-shaped washer (all the washers being aligned) and a screw-threaded member 81 engageable with the bar 79 in a transverse direction.

In operation, when the compressed air supplied to inlet 50 causes the tube 63 to move to the left (when viewed as in FIG. 1), tubular rod 65 moves therewith and by means of the clutching inter-engagement of clutch faces 71, 72 causes the element 70 to be locked into engagement of the tubular member 67 by virtue of the reaction forces acting in the mutually inter-engaged threads 68, 69. Accordingly the tubular member 67 moves outwardly of the casing 51 to transmit the brake applying force to the brake force applying member. Initially, as the tubular member 67 moves outwardly of the casing 51 (which is mounted on the bogie frame of the vehicle for reaction against a frame-welded bracket), the C-shaped washers 76 move therewith until the clearance distance 78 is taken up. Thereafter, any further movement of the tubular member 67 in this direction, for example when the clearance between the brake block or pad and the wheel or disc is greater than that nominally required (e.g. due to wear of the pad or block), will cause a displacement of the stack of washers 76 relative to the tubular member 67. On releasing the braking action by relieving the air pressure supplied to chambers 56 and 58, the compression spring 60 acts to return the brake force actuator to its initial position and also move the tubular rod 65 towards its initial position. Initially at least, during this return movement, the coupling element 70 remains clutched to rod 65. However, if the outward excursion was greater than that nominally required, then during the return movement the spring 73 will act to cause a disengagement of the clutch faces 71, 72 by actuating stem 74. With the element 70 de-clutched from tubular member 67, the element 70 can then rotate relative to member 67 so as to be displaced longitudinally relative thereto, the member 67 being restrained from further return movement by the washers 76.

It will be apparent that the provision and arrangement of the washers 76 provide the illustrated arrangement of FIG. 1 with means sensitive and/or responsive to the required clearance being established between the brake pad or block and the wheel or disc, and that the slack adjusting means (provided principally by element 70 and the two parts it engages) serves to adjust automatically for any increased clearance that tends to arise by wear of the brake block or pad.

When the brake block or pad is to be replaced, the frictional engagement of the tubular member 67 by the C-shaped washers 76 is relieved by the resetting mechanism 80 to allow the tubular member 67 to withdraw inwardly of casing 51 to the maximum extent possible. To this end, the screw-threaded member 81 of the resetting mechanism 80 is screwed inwardly of the casing 51 in a transverse direction so as to cause the bar 79 to pivot and splay apart the ends of the C-shaped washers 76 which thus release their tight frictional engagement of the tubular member 67.

It will be appreciated that if a zero nominal clearance is required between the brake block or pad and the wheel or disc, then the clearance distance 78 may be reduced to zero, e.g. by additional C-shaped washers 76 and/or by shims. It will also be appreciated that the washers 76 (and their associated parts 77, 79, 80, 81) may be omitted where the brake force supplying arrangement of FIG. 1 is used in friction brake apparatus (e.g. according to FIG. 4 or FIG. 5 described below) including clearance sensing means incorporated in a linkage to which the brake force is supplied from said arrangement.

Figure 2A:
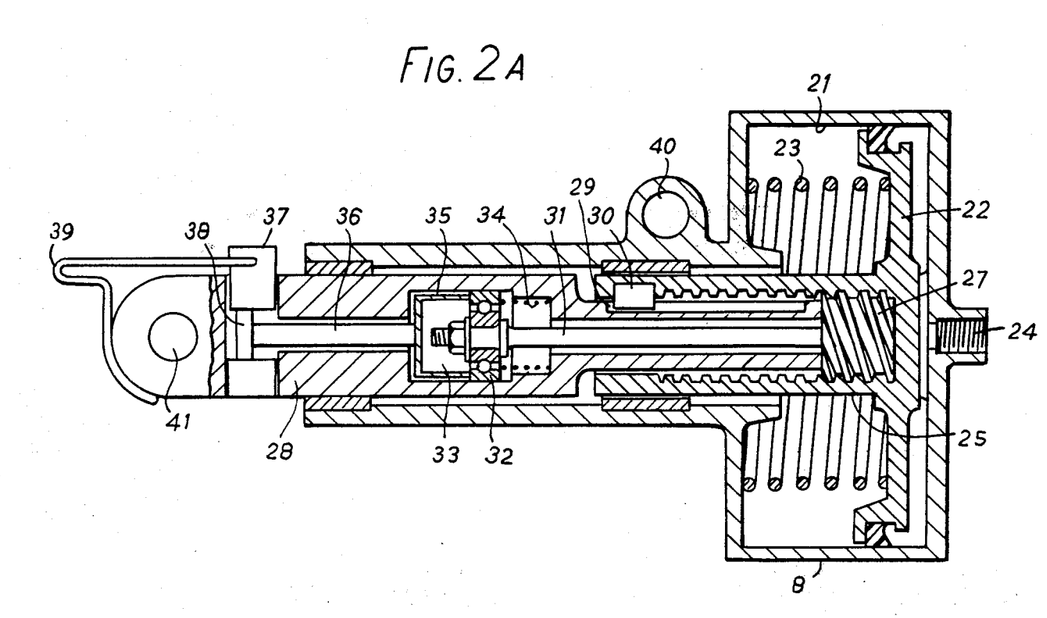
FIGS. 2a and 2b illustrate two states of a brake force supplying arrangement providing, in combination, force actuator means and slack adjusting means in a second form of embodiment of this invention.
Figure 2B:
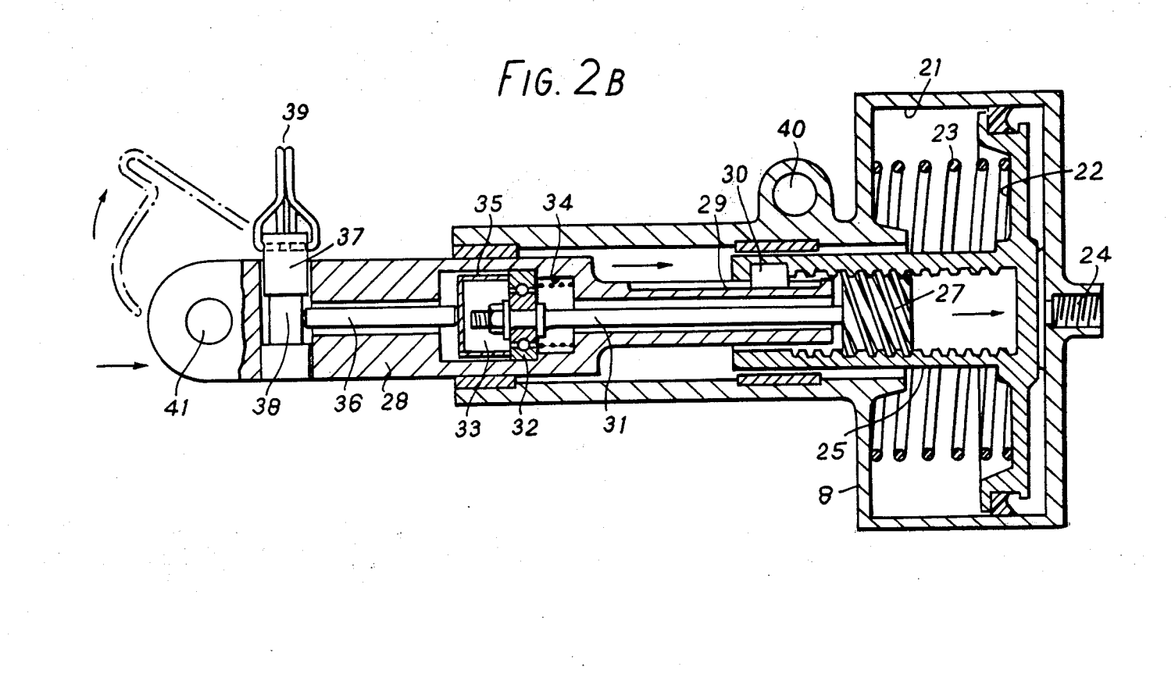

In FIGS. 2a and 2b there is illustrated another brake force supplying arrangement which is a combination of a brake force actuator and a slack adjuster according to this invention, and is to supply the brake force to a linkage incorporating clearance sensing means. This brake force supplying arrangement comprises a tubular actuator member or rod 28 projecting from a housing 8. The housing 8 comprises a brake actuator portion including a cylinder 21 within which there is a sealingly slidable piston 22. The cylinder 21 is pressureable via a fluid pressure input port 24 (for the purposes of making a brake application) to urge the piston 22 to the left (when viewed as illustrated) against the force of a return spring 23. The piston 22 has a trunk 25 which includes an internal helical thread which is engaged non-lockingly by an externally threaded clutch member 27 of which the left-hand radial end face is clutchingly engageable with the right-hand radial end face of the tubular actuator rod 28. Adjacent piston 22, the tubular actuator rod 28 has a reduced diameter inner end portion and its external surface has a groove 29 milled therein. A key 30 in the groove 29 engages the trunk 25 to prevent relative rotational movement but permit longitudinal relative movement as between the actuator rod 28 and the piston trunk 25. The threaded clutch member 27 is connected via rod 31, extending internally of the rod 28, to a caged ball-bearing 32 that is disposed in an internal cylindrical cavity region 33 of the rod 28. The cage is urged by a spring 34, housed in the cavity region 33, in a direction tending to maintain the threaded clutch member 27 in engagement with the inner end of the actuator rod 28, i.e. in the clutched condition. The cage, which is denoted by the reference numeral 35, is provided with a resetting tappet rod 36 engageable with a resetting mechanism comprising a rotable plug 37 extending transversely into the actuator rod 28, which plug 37 is formed with an intermediate resetting cam portion 38, and a combined retaining clip and resetting handle 39 for use in rotating the plug 37. The housing 8 is provided with a pivot bush lug 40, and the end of the actuator rod member 28 that projects from housing 8 is provided with a pivot bush lug 41. The arrangement of FIGS. 2a and 2b is mounted in a friction brake apparatus by means of the pivot bush lugs 40 and 41 to two points of the apparatus that are to be mutually separated to effect a brake application.

On application of a brake fluid pressure applied to port 24, the piston 22 moves leftwardly (when viewed as in FIGS. 2a and 2b) overcoming the force of the return spring 23 and transmitting the resultant brake applying force to the inner end of the actuator rod 28 via the threaded clutch member 27, the latter being locked by its threads to the trunk 25 and by its radial clutch face to the rod member 28. Due inter alia to the rigging strain in the linkage of the apparatus, an outward reaction is created between the pivot bush lugs 40 and 41 acting oppositely to the braking force transmitted to the brake pad or block via said linkage and supplied by the arrangement of FIGS. 2a, 2b. On release of the braking pressure at 24, the return spring 23 returns the piston 22 and trunk 25 in a rightward direction (when viewed as in FIGS. 2a, 2b) and the force of spring 34 is sufficiently high to maintain, initially, the threaded clutch member 27 in clutching engagement of the right hand (inner) radial end of the actuator rod 28. The actuator rod 28 is accordingly withdrawn into the housing 8 up to a point where the resistance (to such inward motion of the rod) exerted by the clearance sensing means incorporated on the linkage and/or by the residual strain in the rigging becomes effective to resist further return movement of the actuator rod 28. At this point, the force of spring 34 is overcome and the reaction forces (till then acting in the inter-engaged threads of element 27 and trunk 25) relieved so that, as represented in FIG. 2b, the trunk 25 urges the clutch member 27 sufficiently out of engagement of the inner radial end of the actuator rod 28 so as to tend to reduce or remove the clutching forces between them, i.e. effect a de-clutching operation. With the clutching forces reduced or removed, the threaded clutch member 27 can rotate relative to and within the inner threaded portion of trunk 25 and thus can move longitudinally relative to the trunk 25 by a distance corresponding to any excess excursion (i.e. greater than that nominally desired) of the rod member 28 in its initial movement relatively outwardly of housing 8, which excess excursion may, for example, have arisen due to wear of the brake pad or block. The ability of the trunk 25 to move longitudinally relative to the threaded clutch member 27 (and the actuator rod 28) enables the piston 22 and trunk 25 to return to their initial position and leave the clutch member 27 adjacent the inner radial end of actuator rod 28 in readiness for immediate clutching engagement upon the next brake application and with the separation between the pivot bush lugs 40 and 41 newly set to provide the required nominal clearance between the brake block or pad and the wheel or disc it is frictionally to engage. Thus the total amount of any slack in the system has been automatically taken up and compensated for in a single operation, i.e. application and release, of the brakes.

In order to reset the slack adjuster of FIGS. 2a, 2b for re-blocking the brakes with new friction blocks or pads, the lever 39 is lifted pivotally clockwise (when viewed as in FIGS. 2a, 2b) to enable it to be used as a convenient handle for rotating the cam 38 formed in member 37 as described above (see FIG. 2b). Such rotation causes leftward movement of the tappet rod 36, bearing cage 35, bearing 32 and rod 31 against the force of spring 34 to disengage or de-clutch the clutching face of member 27. After reblocking, the member 39 is returned to it normal position shown in FIG. 2a and the arrangement is ready for re-operation.

Figure 3A:
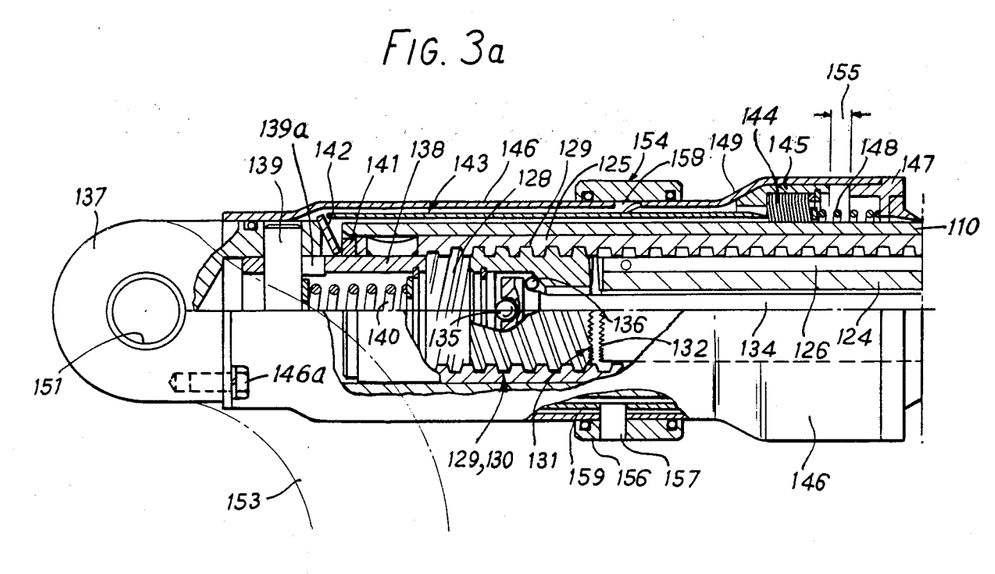
FIGS. 3a and 3b placed together illustrate a partly-sectioned side view of a brake force supplying arrangement including inter alia slack adjusting means in a third form of embodiment of this invention.
Figure 3B:
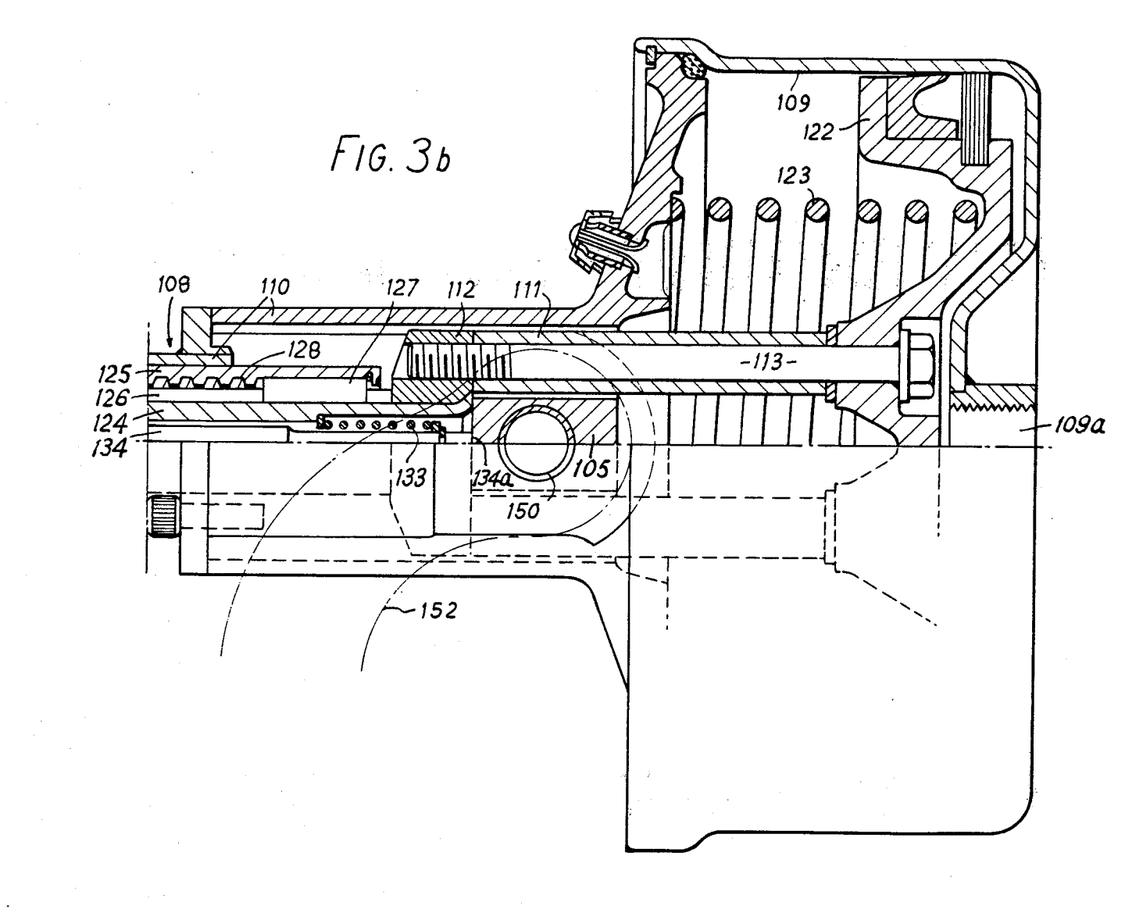

FIGS. 3a and 3b illustrate still another brake force supplying arrangement which is a combination of a brake force actuator and a slack adjuster according to this invention which also incorporates clearance sensing means. The arrangement comprises a housing 108 having a cylinder part 109 and an elongate tubular part 110. The brake force actuator comprises a piston 122 sealingly slidable in the cylinder part 109, the latter being pressurable for making a brake application by fluid pressure supplied thereto via an inlet (not shown) so as to urge the piston 122 leftward (when viewed as in FIG. 3) against the action of a return spring 123. The piston 122 is connected to a double-leg piston rod 111 provided by two axially off-set tubes inter-connected at their ends remote from piston 122 by a bridle 112, two bolts 113 extending through the tubes 111 and serving to fasten together the piston 122, the tubes 111 and the bridle 112. A hollow tubular member 124 is swaged by one end into the bridle 112 to extend within a tubular actuator rod 125 slidably mounted in the elongate housing part 110. The outer surface of tubular member 124 is provided with two diametrically opposite and longitudinally extending milled grooves or keyways 126 each having a key 127 therein to couple together the tubular member 124 and tubular rod 125 such that their relative rotation is prevented but their relative longitudinal motion is permitted. The inner surface of the tubular actuator rod 125 is formed with a helical thread 128, and a coupling element 130 within the tubular rod 125 has it outer surface formed with a mating helical thread 129. The threads 128, 129 providing a non-locking arrangement mutually facing end surfaces 131 and 132 of the coupling element 130 and the tubular member 124 are formed with co-operating or mating V-section grooves and ridges provided in a radiating configuration so as to form the surfaces 131 and 132 as mutually co-operable clutch faces. These two clutch faces 131, 132 are urged into mutual engagement by a helical compression spring 133 acting between the tubular member 124 and a stem 134 extending therethrough (and through the spring 133), the stem 134 being connected to the coupling element 130 via rotational bearing means 135, 136 such that the stem and coupling element are relatively rotatable but incapable of relative longitudinal movement.

The end of actuator rod 125 remote from piston 122 has an extension member 137 mounted thereon via a lost motion device. The latter comprises a tubular piece 138 welded to the interior surface of rod 125 and projecting longitudinally therefrom, the extension member 137 being mounted slidably on the tubular piece 138 and retained by a pin 139 extending transversely through a hole in the extension member 137 and through a longitudinally directed slot in the extension member 137. A helical spring 140 acts between the pin 139 and the inner end of the tubular piece 138 to urge the extension member 137 longitudinally outwardly. A thrust washer 141 is provided around the tubular piece 138 at the end of elongate housing part 110, and a plurality of radiating stiff obliquely disposed leaves 142 are located between the thrust washer 141 and the extension member 137 with their outer peripheral edges extending radially outwardly beyond the outer surface of the housing part 110. This outer surface is encompassed by a sleeve 143 arranged to be engageable at one end by the leaves 142 and to engage at its opposite end a stack of sprag washers or shims 144 that are held in an encompassing carrier ring 145 such that the inner edges of the sprag washers or shims, which are obliquely angled, frictionally engage the outer surface of the elongate housing part 110. Another, outermost sleeve 146 closely surrounds the sleeve 143 but extends longitudinally beyond each end of sleeve 143. At one end the outer sleeve 146 is fixed to the extension member 137 and at its other end the outer sleeve 146 is connected to an end ring 147. A helical spring 148 acts between the end ring 147 and the stack of sprag washers 144 (and/or the carrier ring 145 holding them) so as to urge the stack towards a position of their engagement by the sleeve 143 and so as to urge the carrier ring 145 into abutment of a stepped portion 149 of the outer sleeve 146. The smallest distance between the carrier ring 145 and the end ring 147 (measured longitudinally when the two are at their maximum separation) provides a measure of the nominal brake pad clearace to be provided as will be apparent from the operational method described below. This distance 155 can be preset by screwing end ring 147 into or out of sleeve 146.

The housing 108 is provided with a mounting aperture 150 through the housing part 109, the aperture extending between the two tubes 111 with its axis intersecting the longitudinal axis of the illustrated arrangement. The extension member 137 is provided with a mounting aperture 151 of which the axis likewise intersects the longitudinal axis of the illustrated arrangement. For use, the illustrated arrangement of FIGS. 3a and 3b is mounted by the apertures 150, 151 between two points of the friction brake apparatus with which it is to be associated, these two points being those required to be mutually separated to effect a brake application, e.g. the ends of caliper arms 152, 153 mounting at their opposite ends brake force applying members carrying the brake blocks or pads.

In operation, fluid pressure is supplied to the housing's cylinder part 109 to pressurise it and, assuming point 150 is fixed, move leftwardly (when viewed as in FIGS. 3a and 3b) the brake force actuator comprising piston 122, double-leg piston rod 111, bridle 112, and the hollow tubular member 124. As soon as the tubular member 124 moves in this direction its end face 132 clutchingly engages the adjacent end face 131 of the coupling element 130 and, by virtue of the reaction forces created in the mutually engaged helical threads 129 and 128, effectively locks the coupling element 130 to the actuator rod member 125. The latter and its extension member 137 thereby move in the same direction, the lost motion device being inoperative since the spring 140 is sufficiently strong to overcome any rigging friction that may be encountered. As the extension member 137 moves it carries with it the outer sleeve 146 and end ring 147, overcoming the action of spring 148. The carrier ring 145 and the sprag washers 144 are, at least initially, held fast by friction on the elongate housing part 110. Thus as the distance 155 is reduced, a gap of equal distance is created between the other side of carrier ring 145 and the stepped portion 149 of outer sleeve 146.

If the clearance between the brake block or pad and the wheel or disc is that required and corresponds to the pre-set distance 155, then as the braking force is applied the lost motion device becomes operative so that the extension member 137 moves longitudinally relative to the actuator member 125 and thereby straightens the obliquely disposed leaves 142. If the clearance between the brake block or pad and the wheel or disc is greater than that required (e.g. after a re-blocking operation or due to wear of the block or pad) then initially, after the distance 155 has been taken up, the inner sleeve 143 is moved leftwardly (when viewed as in FIGS. 3a and 3b) by the stack of washers 144, the latter sliding frictionally in this direction over the outer surface of elongate housing portion 110, until, when the braking force is applied and the lost motion device becomes operative to straighten the obliquely disposed leaves 142, the latter then operate as levers to urge the inner sleeve 143 to the right (when viewed as in FIGS. 3a and 3b). Such rightward motion of sleeve 143 causes the obliquely angled portion of the washers 144 to be further deformed and relieve their frictional engagement of the outer surface of housing portion 110. As the braking force is released, the lost motion device initially remains operational to permit relative longitudinal movement between the extension member 137 and actuator member 125 and hence between the outer sleeve 146 and the carrier ring 145. This initial return movement of the outer sleeve 146 progressively reduces to zero the gap between its stepped portion 149 and the carrier ring 145 (and increases correspondingly to its nominal pre-set amount the distance 155) until, when said gap is zero, the leaves 142 regain their initial oblique dispositions and no longer stress longitudinally the inner sleeve 143 against the washers 144 so that the latter can re-engage frictionally the outer surface of elongate housing part 110 in a new position relative thereto. The nominal clearance between the brake block or pad and the wheel or disc will thus be reset to that required, as set by the distance 155.

As the rigging friction or stress is relieved, the reaction forces till then acting in the mutually engaged helical threads 128, 129 will fall and, the clutching forces acting between the faces 131, 132 of element 130 and member 124 will decrease to provide a de-clutching operation as the action of spring 133 is overcome by the return of the piston 122 to its initial position (under the action of spring 123). With the coupling element 130 disengaged or de-clutched from the tubular member 124, the element 130 is free to rotate within tubular member 125 and thus (by virtue of the helical threads 128, 129) move longitudinally relative thereto.

To reset the slack adjuster of FIGS. 3a and 3b for re-blocking the brakes with new friction blocks or pads, the clearance sensing means provided by the stack of sprag washers 144 are re-positioned (to the location illustrated) by a resetting mechanism 154. This resetting mechanism comprises, around the outer sleeve 146, a collar 156 having a pin 157 directed radially inwardly through an oblique, part-helical slot 158 in the outer sleeve 146 and through a short, longitudinally directed slot 159 in the inner sleeve 143. Rotation of the collar 156 relative to the fixedly held outer sleeve 146 causes the inner sleeve 143 to move to the right (when viewed as in FIG. 3a) relative to outer sleeve 146 and thereby further deform the obliquely angled portions of the washers 144 so as to release the latter's frictional engagement of the outer surface of elongate housing part 110. The extension member 137 can then be pushed towards the piston 122 to return the actuator member 125 to its initial position as illustrated in FIG. 3a and also return the inner and outer sleeves 143 and 146 and the carrier ring 145 to their initial positions as illustrated.

Figure 4:
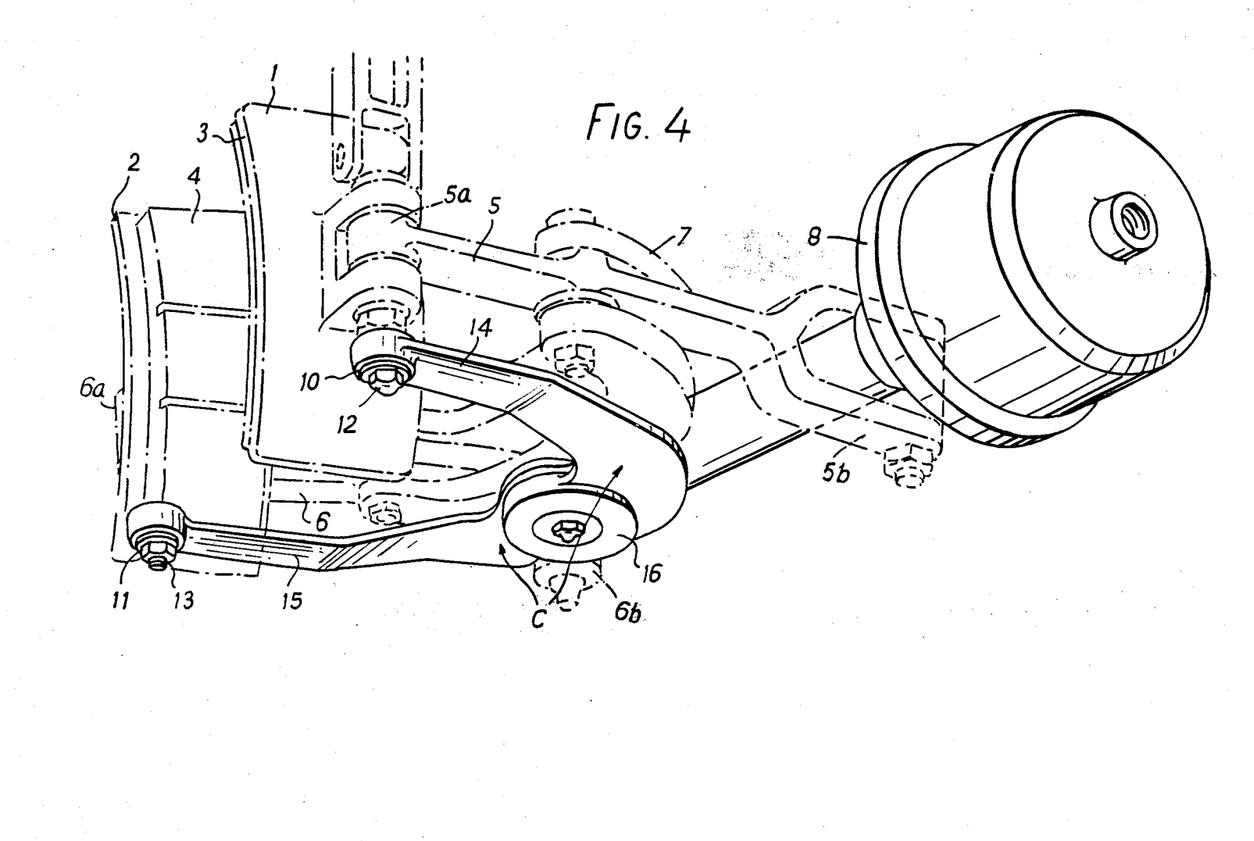
FIG. 4 is a diagrammatic perspective view of friction brake apparatus embodying this invention.

FIG. 4 illustrates one form of friction brake apparatus having a caliper configuration and supporting two brake force applying members 1 and 2 carrying friction pads 3 and 4 which engage one each side of a vehicle wheel to be braked. The member 1 is pivotally carried on one end 5a of a lever 5 by means of a pivot pin 12, and the member 2 is pivotally carried on one end 6a of a lever 6 by means of a pivot pin 13. The two levers 5, 6 are pivotally supported intermediate their ends 5a, 5b and 6a, 6b on a yoke 7 which is supported beneath the chassis of the vehicle (not shown). The inner end 5b of the lever 5 is bifurcated and pivotally coupled to a brake force supplying arrangement which preferably is that described above with reference to FIG. 2, comprising a housing 8 including a combination of a slack adjusting means and a brake force actuator means, the former including an actuator member having one end projecting from the housing 8. The said projecting end of the actuator member is pivotally coupled to the inner end 6b of the lever 6 and it will be seen that by expanding the spacing between the inner ends 5b and 6b of the levers 5 and 6, the outer ends 5a and 6a thereof supporting the brake force applying means 1–4 move towards one another such that the friction pads 3 and 4 can engage the rotating wheel or disc to achieve braking.

Resilient bushes 10 and 11 are respectively provided on depending extensions of the pivot pins 12 and 13, and via these resilient bushes 10 and 11 the respective ends of calipers "C" are coupled to the brake force applying members 1 and 2 so that the calipers are flexibly hung horizontally beneath the yoke 7. The arms 14, 15 of the calipers "C" are pivotally connected and include spring-urging means (not shown) tending to urge the arms 14, 15 outwardly such as to tend to oppose the force of the actuator tending (when operated) to close the calipers. Also included within the central pivoting region or hub 16 of the calipers "C" is a one-way clutch arranged such that after movement of the arms 14 and 15 relatively towards one another, the clutch operates to retain the calipers in such a condition of mutual approach of the caliper arms 14, 15 (the only outward return movement of the brake force applying means 1 and 2 which is normally possible being the limited movement which is permitted by the return or deflection of the resilient bushes 10 and 11).

The one-way clutch between the arms of the calipers is additionally provided with suitable means operable from the outside thereof to disengage the one-way clutch so as to permit resetting of the whole assembly to enable re-blocking of the brake force applying members when the friction pads 3, 4 are worn out.

Typically, the one-way clutch may be stepless and comprise a single heavy rate helical spring which frictionally engages co-operating hub portions at the common pivot of the caliper arms 14 and 15, and the means for disengaging the clutch may be arranged to provide relative movement of the ends of the helical spring to temporarily disengage it from one or other hub portion and free the arms so that their ends can be mutually further re-separated.

Where the apparatus of FIG. 4 is used in conjunction with the brake force supplying arrangement of FIG. 2, the pivot bush lug 40 of the housing 8 is coupled to the inner end 5b of lever 5, and the pivot bush lug 41 at the outwardly projecting end of the actuator rod member 28 is coupled to the inner end 6b of level 6.

The operation of the apparatus of FIG. 4 associated with the arrangement of FIGS. 2a and 2b, is as follows. On application of a brake fluid pressure applied to the port 24, the piston 22 moves leftwardly (when viewed as in FIGS. 2a and 2b) overcoming the force of the return spring 23 and transmits the resultant brake applying force via the threaded clutch member 27 (which is locked by its threads to the trunk 25) to the inner end of the actuator rod 28. An outward reaction is thereby created between the ends 5b, 6b of the levers 5 and 6 to exert a braking force to the vehicle wheel via the brake force applying members 1 and 2. In doing this, the brake force applying members 1, 2 overcome the force of the spring (not shown) acting between the caliper arms 14 and 15, and the arms 14 and 15 are carried inwardly the total amount of movement of the members 1 and 2 less the amount of movement which is permitted by the resilience and/or lost motion provided by the bushes 10 and 11. On release of the braking pressure at 24, the return spring 23 exerts sufficient force to return the piston 22 and trunk 25 in a rightward direction and the force of the spring 34 is sufficiently high, initially, to maintain the threaded clutch member 27 in engagement with the right-hand (inner) radial end of the actuator rod 28. The actuator rod 28 is therefore withdrawn into the housing 8 up to a point where the resistance (to such inward motion of the rod 28) exerted by the one-way clutch in the caliper hub 16 becomes effective to resist further return movement of the brake force applying members 1 and 2. At this point, which is the point at which the brake force applying members 1 and 2 have lifted away from the wheel by a total amount determined by the resilience and/or lost motion at 10 and 11, the force of the spring 34 is overcome and, as shown in the state of affairs in FIG. 2b, the trunk 25 urges the clutch member 27 sufficiently out of engagement of the inner radial end of the actuator rod 28 as to tend to reduce or remove the clutching forces between them. With these clutching forces reduced or removed, the threaded clutch member 27 rotates relative to and within the inner threaded portion of the trunk 25 to permit the piston 22 and trunk 25 to return to their initial position and leave the clutch member 27 adjacent the inner radial end of actuator rod 28. Accordingly the linkage connected to the actuator housing 8 and the rod 28 is left in a new position providing substantially only the clearance of the members 1 and 2 as referred to above, and all the slack in the system has been automatically taken up in a single application and release of the brakes.

In order to reset the slack adjuster to permit reopening of the force-applying members 1 and 2 to enable reblocking by new friction blocks, the lever 39 is operated as described above to disengage the clutching face of member 27. On now operating also the one-way clutch releasing means of the calipers C, the whole assembly is permitted to return to its fully retracted condition by virtue of the outward force which continues to be applied on the resilient bushes and pivot pins by the spring (not shown) between the caliper arms 14 and 15. On subsequent return of the caliper clutch release and return of the member 39 to its normal shown position in FIG. 2a, the mechanism is ready for re-operation after re-blocking of the brake force applying members with new blocks 3 and 4.

Figure 5:
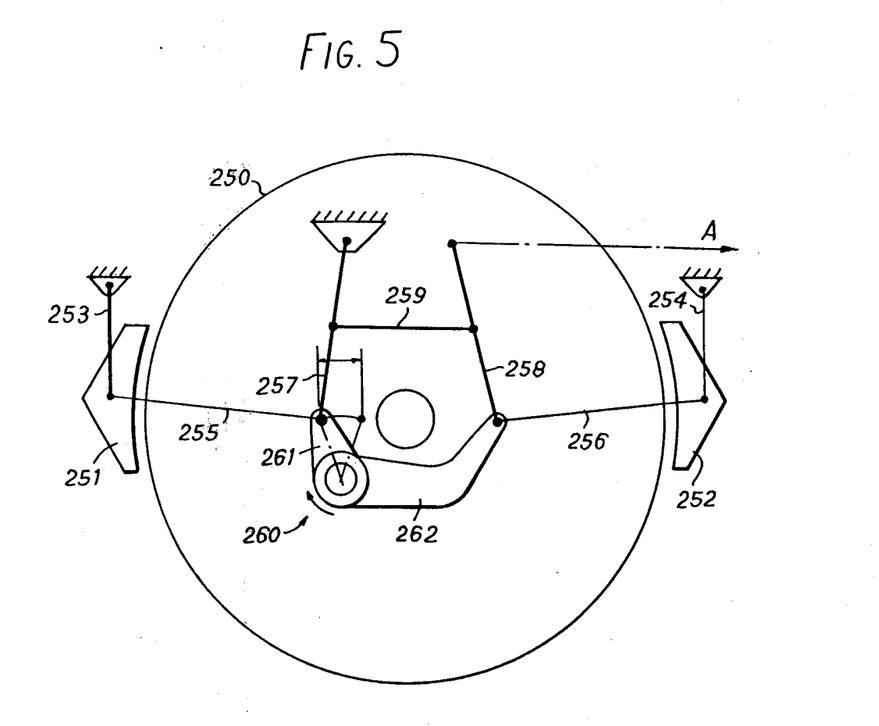
FIG. 5 illustrates schematically another form of friction brake apparatus embodying this invention.

FIG. 5 illustrates schematically a friction brake apparatus of the so-called "clasp brake" type for a railway wheel 250. This apparatus comprises two brake force applying members 251, 252 pivotally mounted on the lower ends of support links 253, 254 that are pivotally mounted by their upper ends to the chassis of the railway vehicle. The arrangement is such that friction pads or blocks carried by the members 251, 252 can engage the rim of the wheel at substantially diametrically opposite locations. The two members 251, 252 are pivotally connected by intermediate links 255, 256 to the lower ends of two arms 257, 258 that are interconnected intermediate their ends by a link 259. The upper end of arm 257 is pivotally mounted on the chassis of the railway vehicle, and the upper end of arm 258 is connected to a brake force supplying arrangement for supplying a brake force in the direction A. Two mutually pivoted limbs 261, 262, forming a caliper 260 are connected by their free ends to the lower ends of arms 257, 258 via resilient bushes. The mutual pivotal connection of the limbs 261, 262 is by means including a one-way clutch, for example formed as described above for the caliper hub 16 of FIG. 4, so as to permit the mutual approach of limbs 261, 262 when a braking force is applied in direction A but prevent mutual separation of limbs 261, 262 when the braking force is released. When the braking force is released, the arms 257, 258 can nevertheless pivot to separate further their lower ends since the latter are connected to the arms 261, 262 by the resilient bushes which permit this separating movement to a limited extent which is predetermined (by appropriate design of the resilient bushes) to correspond to the clearance normally desired between the friction pads or blocks and the wheel rim.

Conveniently the brake force supplying arrangement employed for the embodiment of FIG. 5 may comprise an arrangement similar to that of FIG. 2, or may comprise a brake force actuator, e.g. a simple piston-cylinder device, coupled to a separate slack adjuster.

It is considered feasible that the friction brake apparatus of FIG. 4 or FIG. 5 may employ a brake force applying arrangement other than that of FIG. 2. For example, the arrangement of FIG. 1 or FIG. 3 may be employed when modified by the omission of its clearance sensing mechanism (provided in the arrangement of FIG. 1 by the parts 76–81, and provided in the arrangement of FIG. 3a by at least the parts 142–149). Where the arrangement of FIG. 3 is employed, it is considered that the resilient bushes (10, 11 in FIG. 4), providing lost motion in said apparatus between the one-way clutch and the brake force applying members, can be omitted and their function taken over by the lost motion device including parts 139, 140 of said arrangement which thereby will provide lost motion between the one-way clutch and the slack adjuster. Alternatively, where such resilient bushes are retained, the lost motion device of FIG. 3 is omitted with the clearance sensing mechanism.

Apparatus of the type described may be mounted in brake systems of various well known types such that the forcing apart of two pivoted mounting points e.g. 150, 151, causes the application of a brake force, typically as in a caliper and disc brake arrangement. Considering diagram 3a, 3b, it will be seen that in the general manner of operation the following sequence takes place:

Pressure air applied to the right of piston 122 initially moves the piston and its push rod assembly a small distance to the left to engage clutch faces 131, 132, thereby conferring the effect of a rigid rod from piston 122 to extension member 138. Since spring 140 is pre-loaded to overcome brake rigging friction the applied air pressure moves leftwardly the whole piston and rod assembly including member 137 and the attached outer sleeve 146 until the gap 155 is reduced to zero by contact between end ring 147 and carrier ring 145. Assuming initially correct "brake released" clearance the zeroing of gap 155 will coincide with brake pad contact at the brake disc and member 137 will instantaneously pause in its leftward motion owing to reaction through the rigging while the piston rod assembly terminating at extension 138 continues to move outwardly of tube 108 since the pre-load in spring 140 is not sufficient to transmit a sensible brake force. As the lost motion conferred by the slot in part 138 is taken up so the plurality of radial levers 142 are forced to an upright position thus pressing the end of sleeve 143 against sprag stack 144. Because of the reaction between housing 145 and ring 147 (all lost motions having been taken up) the working inner edges of the sprags are urged marginally to the right and cease to grip extension tube 108. It will be seen that the whole piston, rod, sleeve and sprag assembly thus effectively becomes a solid unit and so long as sensible brake force pressure is applied will move as such relative to tube 108.

Consequent upon maximum brake pressure being applied as appropriate to the required degree of retardation there will be varying elastic deflections of the brake rigging resulting in extending movement of part 137 together with the whole piston assembly beyond the position corresponding to initial pad/disc contact. This additional movement due to strain is recovered, as air pressure is reduced, during the release phase of operation, and it will be appreciated that the sprag element is disengaged from tube 108 throughout the whole strain excursion and return. As air pressure continues to fall, output decreases so that for all practical purposes zero strain and the disappearance of sensible brake force coincide at the position of part 137 corresponding to the friction pads being instantaneously about to cease effective contact with disc. It will be seen that this position will be at an extension corresponding to the initial travel leftwards to pad/disc contact plus a small leftward addition proportional to pad or disc wear that may have occurred during the brake application. Instantaneously with the disappearance of sensible brake force the pre-load in spring 140 will tend to recover the lost motion between parts 137, 138 assisted by the continuing rightward movement of the piston/rod assembly, and part 137 will pause momentarily in its rightward motion, relaxing the pressure forcing lever element 142 and sleeve 143 against the sprag pack which, urged by spring 148 in addition to its own inherent pre-load, immediately makes positive engagement with the surface of tube 108.

Lost motion recovered, item 137 and the attached outer tube 146 are drawn to the right relative to the sprag pack (now effectively fixed in relation to tube 108) until clearance 155, proportional to correct brake pad clearance, is restored. Abutment of shoulder 149 on the sprag housing 145 prevents further withdrawal of part 137 so that continuing rightward movement of the piston assembly disengages clutch faces 131, 132 permitting rotation of coupling element 130 within the helical threaded tubular member 125, urged by spring 133 via rod 134. Retraction of the piston assembly continues to the "fully released" rightward position when abutment of the end of rod 134 on the boss surrounding pivot 150 maintains the clutch faces 131, 132 disengaged until the next brake application.

It will be seen that the apparatus constitutes a brake actuator and slack adjuster which at all times seeks to maintain a constant brake pad/disc clearance in the released condition and thereby confers the well known advantages of a substantially constant actuator working stroke throughout the life of a brake friction element. It will be further appreciated that the slack adjuster is of the type sometimes referred to as a "gulper" in that it will take out all the excess slack existing (within its total stroke capacity) in one complete application and release cycle, whether the excess clearance be great as might occur after re-blocking or very small such as might obtain after a sustained brake application.

Notwithstanding the gulping capability it will be apparent also that the clearance sensor mechanism detects only excess working stroke due to wear or incorrectly set brake clearance and by virtue of automatic disengagement when sensible brake force is present is insensitive to normal stroke variations arising from strain in the rigging system.

Considering now apparatus as illustrated in FIGS. 2a, 2b, and with reference to FIGS. 4 and 5 and 3a it will be apparent that automatic adjustment of the zero clearance datum point, effected via the sprag clutch pack in engagement with tube 108 in FIG. 3a, is equally well provided externally to the main actuator adjuster envelope by the application of a caliper device of a form applicable to a particular brake installation, of which FIGS. 4 and 5 represent typical examples.

In general mode of operation the caliper devices illustrated and described freely follow brake element movement in a "closing" direction after a small lost motion proportional to the correct brake released clearance is taken up during application. On brake release the only "opening" movement permitted is that arising from the lost motion, thus maintaining the desired pad clearance. Thus, in practice, after the first operation when any large excess of clearance will be "gulped", the caliper units will creep progressively towards the closed position through successive operating cycles in detecting and following up normal wear throughout the life of the brake friction elements. It will be appreciated that because the caliper devices are mounted at points in the rigging system where excess movement arising from elastic strain is minimal, the effect of total strain in the rigging under load is not significant in the achievement of desired practical release clearances and hence significantly constant actuator strokes. Thus no system equivalent in function to the lever and sleeve 142, 143 in FIG. 3a is required for the caliper system, this being a virtually direct clearance measurement device.

Having thus described my invention what I claim is:
1. Slack adjusting means comprising a linearly movable input member, a linearly movable output member, and an element for transmitting a brake force from the input member to the output member, characterised in that the input and output members are constrained against relative angular movement by means acting solely between the input member and the output member to permit relative linear movement and prevent relative angular movement therebetween, and in that the element is engaged with one of said members via cooperating helical thread means provided therebetween and the element is engageable with the other of said members via cooperable clutch faces provided therebetween and arranged such that in use the clutch faces are retained in force-transmitting engagement by the reaction forces in the co-operating helical thread means when the said members tend to move in one direction and are disengageable as said reaction forces are removed or relieved when the said members tend to move relatively in the opposite direction thereby to permit relative rotation, and hence relative linear displacement corresponding to the slack to be taken up, between the element and said one member in engagement therewith via the co-operating helical thread means.

2. Slack adjusting means comprising a housing, a linearly movable input member, a linearly moveable output member, and an element for transmitting a force from the input member to the output member, characterised in that:
 (a) the input and output members are constrained against relative angular movement,
 (b) one of said members is of tubular form and is relatively slidable longitudinally over the other said member,
 (c) the inner surface of said one member is formed with a helical thread co-operating with a corresponding helical thread formed about the outer surface of the said element, which element is within said one member for engagement therewith via said helical threads,
 (d) the said element is disposed within said one member adjacent an end of the other member,
 (e) the mutually facing transverse end surfaces of the element and the said other member constitute co-operable clutch faces to be retained in force-transmitting engagement by the reaction forces in the co-operating helical threads when the said members tend to move relatively in one direction and are to be disengageable as said reaction forces are removed or relieved when the said members tend to move relatively in the opposite direction thereby to permit relative rotation, and hence relative linear displacement corresponding to the slack to be taken up, between the element and said one member in engagement therewith via the co-operating helical threads.

3. Slack adjusting means according to claim 2, wherein the mutually facing transverse end surfaces of the element and the said other member are both permanently located within said one member.

4. Slack adjusting means according to claim 2, characterised in that the co-operable clutch faces form a dog clutch.

5. Slack adjusting means according to claim 2, characterised in that the co-operable clutch faces form a friction clutch.

6. Slack adjusting means according to claim 2, characterised in that the said other member is of tubular form, in that a stem extends through the said other member and is attached to the element for longitudinal movement therewith, and in that a spring acting between the stem and the said other member is arranged to engage or clutch the co-operable clutch faces, and including means for inhibiting the action of the spring in a predetermined position of the input member in relation to the housing.

7. Slack adjusting means according to claim 2, characterised in that said one member is constituted by the input member and in that the said other member is constituted by the output member.

8. Slack adjusting means according to claim 2, characterised in that said one member is constituted by the output member and in that the said other member is constituted by the input member.

9. Slack adjusting means according to claim 2, characterised in that the output member is arranged to project outwardly from a housing for the slack adjusting means, and in that said housing provides a chamber for a pressure medium, the chamber having a movable well operatively connected to said input member.

10. Slack adjusting means according to claim 2, characterised in that the output member is arranged to project outwardly from a housing for the slack adjusting means, and in that clearance sensing means are provided operatively between the output member and the housing to prevent or at least hinder return of the output member inwardly of the housing following an outward excursion of the output member greater than a predetermined amount.

11. Friction brake apparatus comprising a pair of brake force applying members forming a caliper brake configuration, a brake force actuator to effect an application of the brakes upon an outward actuator stroke and to effect release of the brakes upon a return actuator stroke, slack adjusting means coupled to the brake force actuator to permit full stroke return of the brake force actuator, and a linkage intercoupling the slack adjusting means and the brake force applying members, said linkage including a caliper having two arms respectively coupled to the brake force applying members, a one-way clutch between said arms to resist, when effective, movement apart of the brake force applying members under the brake force actuator's return motion, and means to permit such movement apart by a predetermined distance before the one-way clutch becomes effective to resist further such movement apart.

12. Apparatus according to claim 11, characterised by the provision of means to provide lost motion between the one-way clutch and the force applying members to an extent corresponding to said predetermined distance.

13. Apparatus according to claim 11, characterised in that resilient means is provided between the one-way clutch and the brake force applying member to take up or accomodate said predetermined distance.

14. Apparatus according to claim 11, characterised in that the one-way clutch is included in position sensing means arranged to take up a position corresponding to the position of the force applying members in a brake application, the position sensing means incorporating means which resiliently opposes the force exerted by the actuator.

15. Apparatus according to claim 11, characterised by the provision of resilient means between at least one force applying member and an associated one of the caliper arms to take up or accommodate said predetermined distance.

16. Apparatus according to claim 11, characterised by the provision of means to provide lost motion between the clutch and the slack adjusting means.

17. Apparatus according to claim 11, characterised in that the one-way clutch is a stepless frictional clutch.

18. Apparatus according to claim 11, characterised in that the one-way clutch comprises a heavy rate helical spring member which frictionally engages co-operating hub portions of the caliper's two arms, the latter being mutually pivoted about the axis of the helical spring member.

19. Friction brake apparatus comprising a brake force applying member, a brake force actuator to effect an application of the brakes upon an outward actuator stroke and to effect release of the brakes upon a return actuator stroke, slack adjusting means between the brake force actuator and the force applying member to permit full stroke return of the actuator and a reaction responsive linkage between the slack adjusting means and the brake force applying member, said linkage being coupled to a one-way clutch to resist, when engaged, return movement of the brake force applying member, and means to permit such return movement for a predetermined distance corresponding to required brake clearance before the one-way clutch becomes effective to resist further such return movement.

20. Friction brake apparatus comprising a brake force applying member, a brake force actuator to effect an application of the brakes upon an outward actuator stroke and to effect release of the brakes upon a return actuator stroke, slack adjusting means coupled to the brake force actuator to permit full stroke return of the actuator, and a linkage intercoupling the slack adjusting means and the brake force applying member, said linkage including:

(a) a one-way clutch to resist, when effective, return movement of the brake force applying member, the said one-way clutch comprising a heavy rate helical spring member which frictionally engages co-operating hub portions of two arms mutually pivoted about the axis of the helical spring member; and (b) means to permit return movement of the brake force applying member for a predetermined distance before the one-way clutch becomes effective to resist further such return movement.

21. Friction brake apparatus as claimed in claim 11, wherein said slack adjusting means comprises a linearly moveable input member, a linearly moveable output member, and an element for transmitting a brake force from the input member to the output member, characterised in that:

(a) the input and output members are constrained against relative angular movement, (b) one of said members is of tubular form and is relatively slidable longitudinally over the other said member, (c) the inner surface of said one member is formed with a helical thread co-operating with a corresponding helical thread formed about the outer surface of the said element, which element is within said one member for engagement therewith via said helical threads, (d) the said element is disposed within said one member adjacent an end of the other member, (e) the mutually facing transverse end surfaces of the element and the said other member constitute co-operable clutch faces to be retained in force-transmitting engagement by the reaction forces in the co-operating helical threads when the said members tend to move relatively in one direction and are to be disengageable as said reaction forces are removed or relieved when the said members tend to move relatively in the opposite direction thereby to permit relative rotation, and hence relative linear displacement corresponding to the slack to be taken up, between the element and said one member in engagement therewith via the co-operating helical threads.

* * * * *